United States Patent

[11] 3,603,004

| [72] | Inventor | Sidney Fink |
| | | 2711 E. 28th Street, Brooklyn, N.Y. 11235 |
| [21] | Appl. No. | 779,789 |
| [22] | Filed | Nov. 29, 1968 |
| [45] | Patented | Sept. 7, 1971 |

[54] ARCHITECTURAL INTERIOR-SIMULATING ARRANGEMENT
8 Claims, 10 Drawing Figs.

[52] U.S. Cl. ..................................................... 35/16, 46/21
[51] Int. Cl. ..................................................... G09b 25/04
[50] Field of Search ......................................... 35/7.3, 16; 46/19, 21

[56] References Cited
UNITED STATES PATENTS

| 1,302,785 | 5/1919 | Gilbert | 46/21 |
| 1,426,087 | 8/1922 | Metcalfe | 46/19 UX |
| 2,284,458 | 5/1942 | Van Antwerp | 35/16 |
| 2,522,149 | 9/1950 | Tunstall | 35/16 |
| 2,528,211 | 10/1950 | Civkin | 35/16 |
| 2,607,972 | 8/1952 | Rust | 35/16 X |
| 2,738,584 | 3/1956 | Parker | 35/16 X |
| 3,269,034 | 8/1966 | Glass | 35/16 X |

*Primary Examiner*—Harland S. Skogquist
*Attorney*—Sparrow and Sparrow

ABSTRACT: An arrangement for simulating the layout of architectural interiors to a predetermined scale. Wall panels may be arranged in any desired configuration upon a floor base having scales marked upon its surface from which the dimension and area of a room or similar space may be readily obtained. Doors, windows and wall decorations may be freely located on the wall panels through magnetic attraction effects. Interior furnishings are designed to scale, and have an appearance simulating the actual furniture to be placed within the full scale interiors.

PATENTED SEP 7 1971   3,603,004
SHEET 1 OF 2
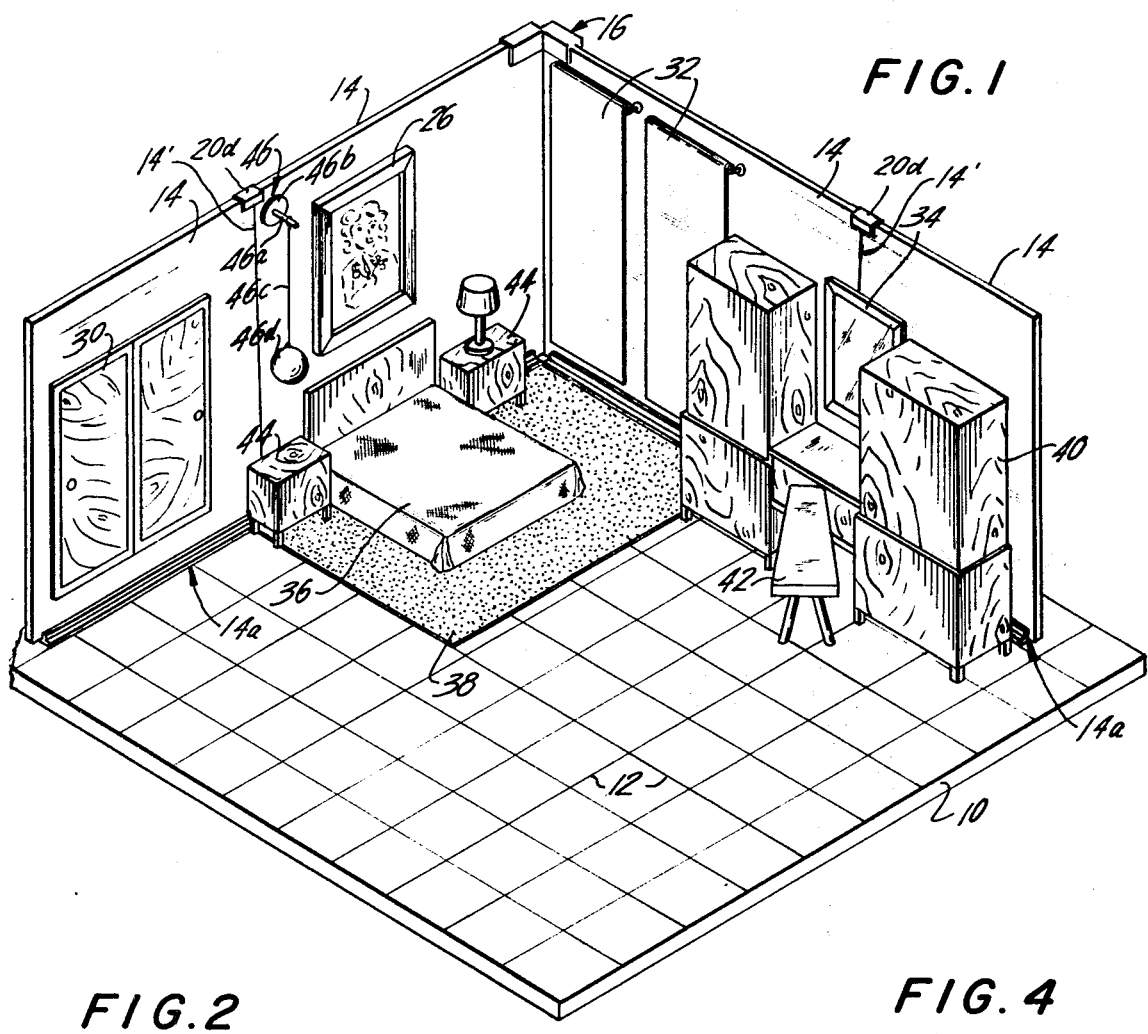
FIG.1
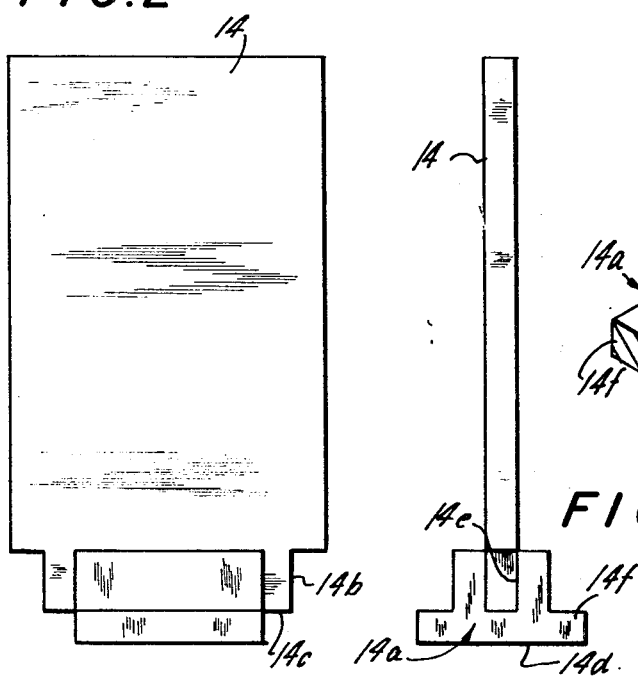
FIG.2
FIG.3
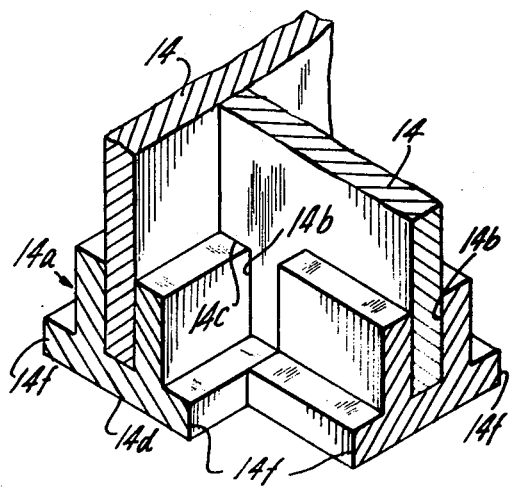
FIG.4
INVENTOR
SIDNEY FINK
BY
SPARROW AND SPARROW
ATTORNEYS

INVENTOR
SIDNEY FINK
BY
SPARROW AND SPARROW
ATTORNEYS

ARCHITECTURAL INTERIOR-SIMULATING ARRANGEMENT

BACKGROUND OF THE INVENTION

In the design of architectural interiors used for residential, office or plant purposes, it is generally difficult to predict beforehand, from a layout drawing, the final appearance of a particular space after being furnished. Thus, a layout drawing is generally a plan or top view of the floor, in which the various furnishings are often represented in block diagram form, or not at all. When such block-shaped furnishings are included in the plan layout of the drawing, they often tend to complicate the drawing to the extent that a clear understanding or visualization of the layout is not readily possible. As a result, such furnishings are often omitted from such plan views of an interior layout. Furthermore, even in a very simple interior arrangement in which the clarity is not impeded through the presence of a large amount of furnishings, it is not possible to predict accurately the behavior of persons in relation to the interior surroundings, when viewed from a floor plan layout drawing.

The foregoing inconveniences and disadvantages are overcome by the present invention which provides a physical three-dimensional model simulating, to scale, the actual planned layout of architectural and decorative interiors.

SUMMARY OF THE INVENTION

An arrangement for simulating the layout of a residence, office, school or plant, or similar architectural interiors, to a predetermined scale. Wall panel sections, dovetailed at their base, may be moved in any desired manner upon the surface of a floor panel, for the purpose of simulating interiors of predetermined dimensions and area. The floor surface has inscribed on it scale markings which facilitate the wall panels to be placed so as to form configurations of preselected dimensions. The arrangement of the doors and windows within the interiors, may be varied through magnetically attracted panels which may be placed at any location on the walls. The walls are provided with iron or ferromagnetic material, so that the magnetic panels resembling doors or windows may be readily held at any surface of the walls. Pictures and other wall decorations may be similarly secured to the walls through magnetic attraction. Model furniture resembling the actual furnishings to be contained within the interior space, may be freely moved within the room or space to obtain an optimum arrangement.

It is an object of the present invention to provide a physical three-dimensional model simulating to scale, the actual planned layout of architectural interiors.

It is a specific object of the present invention to permit changes in the model to be carried out freely with regard to dimensions of the interior space, and the placement of furnishings within the space. Through such freedom in assembling the model, an optimum arrangement may be realized, which will prove satisfactory from the functional viewpoint, as well as from the viewpoint of the persons to be residing or working within the confined interiors.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawing, in which FIG. 1 is a partial isometric view of the interior of a typical room to be simulated in accordance with the present invention;

FIG. 2 is an elevational view of a wall panel used in the layout of FIG. 1;

FIG. 3 is an end view of the wall panel of FIG. 2;

FIG. 4 is a partial sectional view and shows two wall panels intersecting at right angles to each other;

DESCRIPTION OF THE PREFERRED EMBODIMENTS

Figure 6:
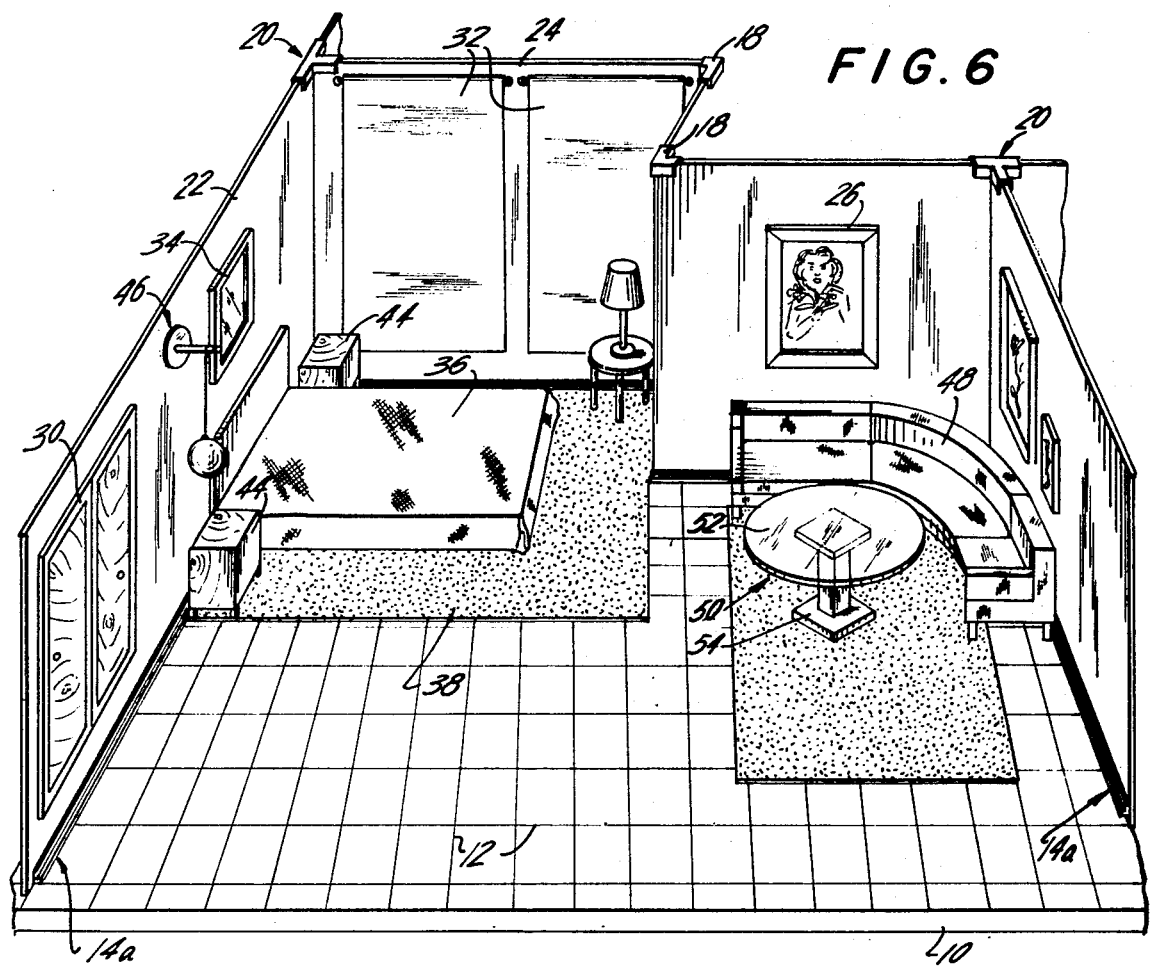
FIG. 6 is a partial isometric view of typical architectural interiors and shows two adjoining rooms.

Referring to the drawing, a floor panel 10 has inscribed on it grid markings 12 which represent, to scale, a given interior distance. A convenient scale for such purpose may be 1½ inches per foot, for example. The grid lines are marked lightly on the surface of the floor panel or base 10 so as not to interfere with the general appearance of any interior room which may be established. These grid lines 12 may be either marked upon the surface or etched into it. The surface of the floor may be painted or covered with paper to provide the appearance of any particular type of flooring that may be desired.

Wall panels 14 which may vary in width to suit are placed upright or perpendicular to the surface of the floor 10. The wall panels 14 are constructed so as to permit them to be freely placed at any location on the floor. Thus, the wall panel 14 has a floor base 14a which maintains the wall panel upright and stable with respect to the floor. The wall panel 14, as shown in FIG. 2, has cutouts 14b at its lower portion. The length of the base 14a, furthermore, is less than the width of the wall panel remaining after the cutouts 14b have been applied. Thus, at its lowermost edge, the wall panel 14 extends by the amount 14c beyond both ends of the base 14a. The purpose of this shape of the wall panel at its lower end, is to permit dovetailing of adjacent walls 14 so that they meet in alignment, as shown at 14' in FIG. 1, or come in contact at an angle of 90°, as shown in FIG. 4. While such dovetailing would not be required if the base 14a were not to be used, the application of such a base 14a is essential to maintain the wall panel 14 upright and stable, so that it will stand on its own.

The particular shaping of the lower portion of the wall panel as shown in FIG. 2, in accordance with the present invention, permits proper abutment of the walls when inserted into the bases 14a. The latter has a transverse cross section in the form of an inverted double T. The surface 14d in contact with the floor is the widest surface of the base. A channel 14e extends longitudinally along the base. This longitudinal channel 14e accommodates the lower edge of the wall panel 14. Flanges 14f on both sides of the base 14a contribute to the stability of the base and hence to the wall panel 14.

To secure two intersecting wall panels firmly together, the clip-on fastening devices illustrated in FIG. 5 are provided. Thus, when two wall panels 14 intersect to form the corner of a room as shown as FIG. 1, for example, an L-shaped clip or bracket 16 may be used. The clip or bracket 16 is open at one edge to permit the bracket to be also used when the wall panels intersect so as to form a T. In another embodiment of the bracket shown in FIG. 5c, the bracket 18 is entirely closed on both sides, in contrast to the embodiment of FIG. 16, and as a result this bracket 18 is usable only when the two walls intersect in an L fashion. While the bracket 16 has more flexible application than the design of bracket 18, the latter is simpler to manufacture.

Figure 5A:
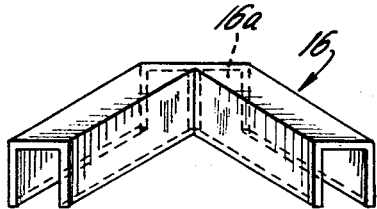
FIGS. 5a, 5b, 5c and 5d are isometric views of different embodiments of bracket for securing together intersecting wall panels.
Figure 5B:
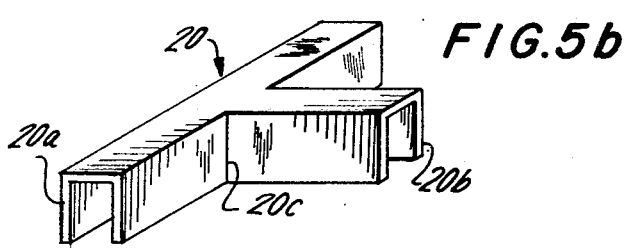

If the bracket 18 is used exclusively, then a T-bracket is required as shown in FIG. 5b for cases in which the wall panels intersect in a I manner as shown in FIG. 6. Thus, the T-bracket 20 is required because the bracket 18 does not have a cutout which permits one wall panel to extend beyond the other intersecting wall panel on both sides. The portion 20a has this characteristic which is not present in either leg of the L-bracket 18. Thus, the wall panel 22 of FIG. 6 passes through the sectional portion 20a, whereas the wall panel 24 is held by the portion 20b of the bracket 20. The two portions 20a and 20b are secured to each other by being integrally formed or welded together at the edge 20c.

Where two aligned walls 14 are to be held in abutting contact as seen at 14' (FIG. 1), then a straight channelled clip or bracket 20d is used.

Figure 7:
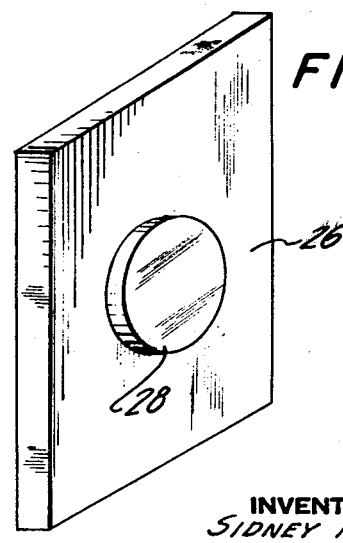
FIG. 7 is an isometric view of a typical wall decoration with magnet attached for securing to a wall panel in accordance with the present invention.
Figure 5C:
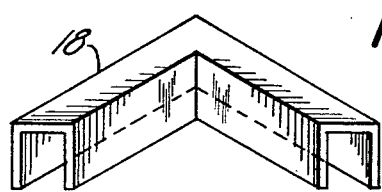
Figure 5D:
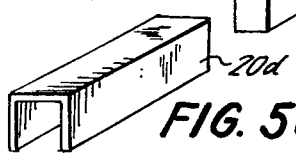

The wall panel 14 is either lined or impregnated with iron or ferromagnetic substance. The purpose of containing such material on or within the wall panels 14, is to attract magnetically pictures or paintings, for example, which have secured to them a magnet. As shown in FIG. 7, for example, a picture or painting 26 has mounted to it, or secured to it a magnet 28. The magnet is mounted or attached to the back of the picture or painting 26. As a result of the magnet 28 and the ferromagnetic substance on or within the wall panel 14, the picture or painting 26 may be located at any desired position on the wall panel.

This same principle may be extended to doors or windows of the simulating model. Thus, the doors 30 and window shades 32 are merely thin panels decorated to resemble their full-scaled counterparts. The doors 30 and window shades 32 have, on their back, a magnet 28 similar to that shown in FIG. 7. As a result of this magnet on the back of the door or window shade panels, it is possible to locate these doors or windows wherever deemed convenient on, or along, the wall panels.

This same principle may further be extended to include the mirror 34 which is also only a panel representing, to scale, an actual mirror. A magnet on the back of the mirror 34 permits the latter to be conveniently located on the wall wherever desired. The interior furnishings such as the bed 36, carpet 38, dresser 40, chair 42, and night table 44 may all be readily shaped from wood, for example, and painted or covered with suitable colored papers to simulate the actual furnishings planned for the respective interiors. Thus, the carpet 38 may, for example, be in the form of a simple sheet of plastic or cloth. The lamp 46 may consist of a rod 46a held to the wall by means of a base 46b having a magnet 28 attached to it. A string 46c suspended from the end of the rod 46a has attached to it a Christmas ball 46d, so that the entire combinations of these elements of the lamp 46 represents an actual lamp of this type, when viewed from a reasonable distance.

Similarly, sectional furniture may be used to compose a sofa 48 as shown in FIG. 6. The table 50 may consist of a simple plastic disc 52 supported by a base 54. Through the use of the present invention it is possible to arrange and rearrange the proposed furnishing within the interiors, and at the same time vary the dimensions of the interior spaces, so as to find an optimum combination which will meet all of the requirements from the functional viewpoint, as well as the likes and dislikes of the persons within the proposed interiors.

The arrangement in accordance with the present invention, provides an accurate and fully representative view of architectural interiors, before actual building or furnishing is carried out. As a result, considerable economy and savings are realized through the use of the present invention, by eliminating the usual subsequent costly changes which are often carried out after the structure has been built or the interiors have been furnished.

While the invention has been described and illustrated with respect to certain preferred examples which give satisfactory results, it will be understood by those skilled in the art after understanding the principle of the invention, that various changes and modifications may be made without departing from the spirit and scope of the invention and it is intended therefore in the appended claims to cover such changes and modifications.

What is claimed is:

1. An arrangement for simulating the layout of architectural interiors to a predetermined scale comprising, in combination, floor means; wall panel means placeable in any desired position on said floor means, the plane of said wall panel means being angularly disposed in relation to the plane of said floor means and having magnet attracting means for attracting magnetic means to the surface of said wall panel means; wall-decorating means with magnetic means attractable to said wall panel means, said decorating means being attachable to any desired location on said wall panel means; and simulating furnishing means resembling in its exterior appearance furnishings for said architectural interiors, said furnishing means being placeable within said simulating arrangement so that a predetermined layout of architectural interiors are simulated, an inverted T-shaped member with a longitudinal slot extending substantially along the length of the bottom edge of said wall panel means and admitting said wall panel means at the bottom edge thereof for retaining said wall panel means in an upright position, said T-shaped member having flanges on both sides of said wall panel means and in contact with said floor means for increasing the contact area between said base means and said floor means and thereby increase the upright stability of said wall panel means, said flanges being the cross portions of said T-shaped member, the length of said bottom edge of said wall panel means being greater than the length of said longitudinal slot, at least one bottom corner of said wall panel means having a rectangular cutout shaped in conformance with the exterior surface of said inverted T-shaped member on one side of said wall panel means above said flanges, said inverted T-shaped member being spaced from the inner vertical edge of said rectangular cutout and permitting dove-tailing intersection of said panel means.

2. The arrangement as defined in claim 1 including grid markings on the upper surface of said floor means for representing to scale floor dimension of the interiors to be simulated.

3. The arrangement as defined in claim 1 including an L-shaped bracket for securing intersecting wall panels to each other.

4. The arrangement as defined in claim 1 including a T-shaped bracket for securing intersecting wall panels to each other.

5. The arrangement as defined in claim 3 wherein said L-shaped bracket is open along one edge at the intersection of the two legs of said L-shaped bracket.

6. The arrangement as defined in claim 1 wherein said wall decorating means comprises panel means resembling on its visible surface door means.

7. The arrangement as defined in claim 1 wherein said wall-decorating means comprises panel means resembling on its visible surface window means.

8. The arrangement as defined in claim 1, said floor means having an upper surface equivalent in appearance to the floor within said interiors to be simulated, and floor-decorating means placeable on said floor means at any desired location thereof.